(12) United States Patent
Patel et al.

(10) Patent No.: US 12,556,299 B2
(45) Date of Patent: Feb. 17, 2026

(54) OPTICAL SYSTEM WITH OFFLOADED OPTICAL COMPONENTS

(71) Applicant: Cisco Technology, Inc., San Jose, CA (US)

(72) Inventors: Vipulkumar K. Patel, Breinigsville, PA (US); Romesh Kumar Nandwana, Breinigsville, PA (US); Norbert Schlepple, Macungie, PA (US); Eng Wen Ong, Breinigsville, PA (US); Prakash B. Gothoskar, Allentown, PA (US)

(73) Assignee: Cisco Technology, Inc., San Jose, CA (US)

( * ) Notice: Subject to any disclaimer, the term of this patent is extended or adjusted under 35 U.S.C. 154(b) by 281 days.

(21) Appl. No.: 18/353,781

(22) Filed: Jul. 17, 2023

(65) Prior Publication Data

US 2025/0030497 A1    Jan. 23, 2025

(51) Int. Cl.
*H04J 14/06* (2006.01)
*H04B 10/67* (2013.01)

(52) U.S. Cl.
CPC ............ *H04J 14/06* (2013.01); *H04B 10/671* (2013.01)

(58) Field of Classification Search
CPC .............................. H04J 14/06; H04B 10/671
See application file for complete search history.

(56) References Cited

U.S. PATENT DOCUMENTS

| | | | |
|---|---|---|---|
| 2014/0001347 A1* | 1/2014 | Nagarajan | G01J 1/0429 250/225 |
| 2020/0158964 A1* | 5/2020 | Winzer et al. | G02B 6/4204 |
| 2020/0183085 A1* | 6/2020 | Mentovich | G02B 6/1223 |
| 2021/0272944 A1 | 9/2021 | Bchir | |
| 2021/0294033 A1 | 9/2021 | Wong et al. | |

(Continued)

OTHER PUBLICATIONS

Keijiro Suzuki et al., "Wavelength (DE)MUX-and-Switch Based on 5.5%-D-Silica PLC/Silicon Photonics Hybrid Platform," National Institute of Advanced Industrial Science and Technology, Dated: Oct. 2021, pp. 1-6.

(Continued)

*Primary Examiner* — Kenneth N Vanderpuye
*Assistant Examiner* — Asif Shameem
(74) *Attorney, Agent, or Firm* — Patterson + Sheridan, LLP (57) ABSTRACT

The present disclosure describes an optical system and method of operating the optical system. The optical system includes a substrate and first and second photonic integrated circuits. The first photonic integrated circuit is positioned on the substrate. The second photonic integrated circuit is positioned on the first photonic integrated circuit. The second photonic integrated circuit receives a first optical signal that includes a first mode and a second mode. The second photonic integrated circuit includes a polarization splitter rotator, a first demultiplexer, and a second demultiplexer. The polarization splitter rotator separates the first optical signal into a second optical with the first mode and a third optical signal with the first mode. The first and second demultiplexers separate the second and third optical signals into first and second pluralities of optical signals. The first and second pluralities of optical signals couple into the first photonic integrated circuit.

16 Claims, 11 Drawing Sheets

(56) References Cited

U.S. PATENT DOCUMENTS

2022/0221662 A1    7/2022  Winzer
2022/0404544 A1    12/2022  Winterbottom et al.
2023/0085761 A1*  3/2023  Witmer ................ G02B 6/1228
                                                                   385/16
2023/0367087 A1*  11/2023  Mayukh et al. ......... G02B 6/43

OTHER PUBLICATIONS

L. Soldano et al., "Multi-wavelength 100Gb/s silicon photonics based transceiver with silica mux/demux and MEMS-coupled InP lasers," 2017 Optical Fiber Communications Conference and Exhibition (OFC), Los Angeles, CA, USA, 2017, pp. 1-3. [Abstract Only].

"Planar Light Wave Circuit LiDAR OPA & Optical Waveguide Devices: AWG CWDM MUX / DEMUX," WayOptics, Date Access: Jul. 11, 2023, pp. 1-7.

J. C. Mikkelsen et al., "Polarization-insensitve silicon nitride Mach-Zehnder lattice wavelength demultiplexers for CWDM in the O-band," Optics Express, vol. 26, No. 23, dated: Nov. 12, 2018, pp. 1-9.

* cited by examiner

OPTICAL SYSTEM WITH OFFLOADED OPTICAL COMPONENTS

TECHNICAL FIELD

Embodiments presented in this disclosure generally relate to optical systems. More specifically, embodiments disclosed herein relate to an optical system with offloaded optical components.

BACKGROUND

Photonic integrated circuits are used to convert between optical signals and electronic signals. For example, the photonic integrated circuit may produce an electronic signal from a received optical signal (e.g. using a photodiode). The photonic integrated circuit may then communicate the electronic signal to an electronic integrated circuit for further processing.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

The present disclosure describes an optical system and method of operating the optical system. According to an embodiment, the optical system includes a substrate, a first photonic integrated circuit, and a second photonic integrated circuit. The first photonic integrated circuit is positioned on the substrate. The second photonic integrated circuit is positioned on the first photonic integrated circuit. The second photonic integrated circuit receives a first optical signal that includes a first mode and a second mode different from the first mode. The second photonic integrated circuit includes a polarization splitter rotator, a first demultiplexer, and a second demultiplexer. The polarization splitter rotator separates the first optical signal into a second optical with the first mode and a third optical signal with the first mode. The first demultiplexer separates the second optical signal into a first plurality of optical signals. The second demultiplexer separates the third optical signal into a second plurality of optical signals. The first plurality of optical signals and the second plurality of optical signals couple into the first photonic integrated circuit.

According to another embodiment, a method includes receiving, at a first photonic integrated circuit, a first optical signal that includes a first mode and a second mode different from the first mode. The first photonic integrated circuit includes a polarization splitter rotator, a first demultiplexer, and a second demultiplexer. The method also includes separating, by the polarization splitter rotator, the first optical signal into a second optical with the first mode and a third optical signal with the first mode. The method further includes separating, by the first demultiplexer, the second optical signal into a first plurality of optical signals, separating, by the second demultiplexer, the third optical signal into a second plurality of optical signals, and coupling the first plurality of optical signals and the second plurality of optical signals couple into a second photonic integrated circuit. The first photonic integrated circuit is positioned on the second photonic integrated circuit.

According to another embodiment, an optical circuit includes a fiber array unit, a photonic integrated circuit, and an electronic integrated circuit. The fiber array unit includes a polarization splitter rotator and a plurality of demultiplexers. The polarization splitter rotator separates a first optical signal into a second optical with a first mode and a third optical signal with the first mode. The first optical signal includes the first mode and a second mode different from the first mode. The plurality of demultiplexers separate the second optical signal into a first plurality of optical signals and the third optical signal into a second plurality of optical signals. The photonic integrated circuit produces one or more electronic signals based on the first plurality of optical signals and the second plurality of optical signals from the fiber array unit. The fiber array unit is positioned on the photonic integrated circuit. The electronic integrated circuit is positioned on the photonic integrated circuit. The electronic integrated circuit receives the one or more electronic signals from the photonic integrated circuit.

Example Embodiments

Photonic integrated circuits are used to convert optical signals into electronic signals, and vice versa. As bandwidth requirements for optical systems and networks have increased, so have the sizes (e.g., die footprints) of the photonic integrated circuits. For example, passive optical components (e.g., wavelength multiplexers and demultiplexers, polarization handlers, and fiber array units) in the photonic integrated circuits may increase the sizes of photonic integrated circuits by 25% to 30%. As the sizes of the photonic integrated circuits grow, so does the risk of warpage, which has a detrimental effect on optical coupling and efficiency.

Additionally, efforts to reduce the thickness of photonic integrated circuits have reduced the vertical clearance available to edge couple fiber array units or fibers to the photonic integrated circuits. For example, when the photonic integrated circuit is positioned on a substrate, the reduced thickness of the photonic integrated circuit does not provide much vertical space for a fiber or fiber array unit to edge couple to the photonic integrated circuit without hitting or contacting the substrate.

The present disclosure describes an optical system that may offload some of the passive optical components from the photonic integrated circuit. Generally, the optical system includes a second photonic integrated circuit that includes some of the passive optical components (e.g., polarization splitter rotator, demultiplexers, spot size converter, etc.) that would otherwise be included in the photonic integrated circuit. The second photonic integrated circuit may also optically couple to the photonic integrated circuit through a top surface of the photonic integrated circuit. As a result, the second photonic integrated circuit provides additional vertical clearance for an optical fiber to edge couple to the second photonic integrated circuit.

Figure 1:
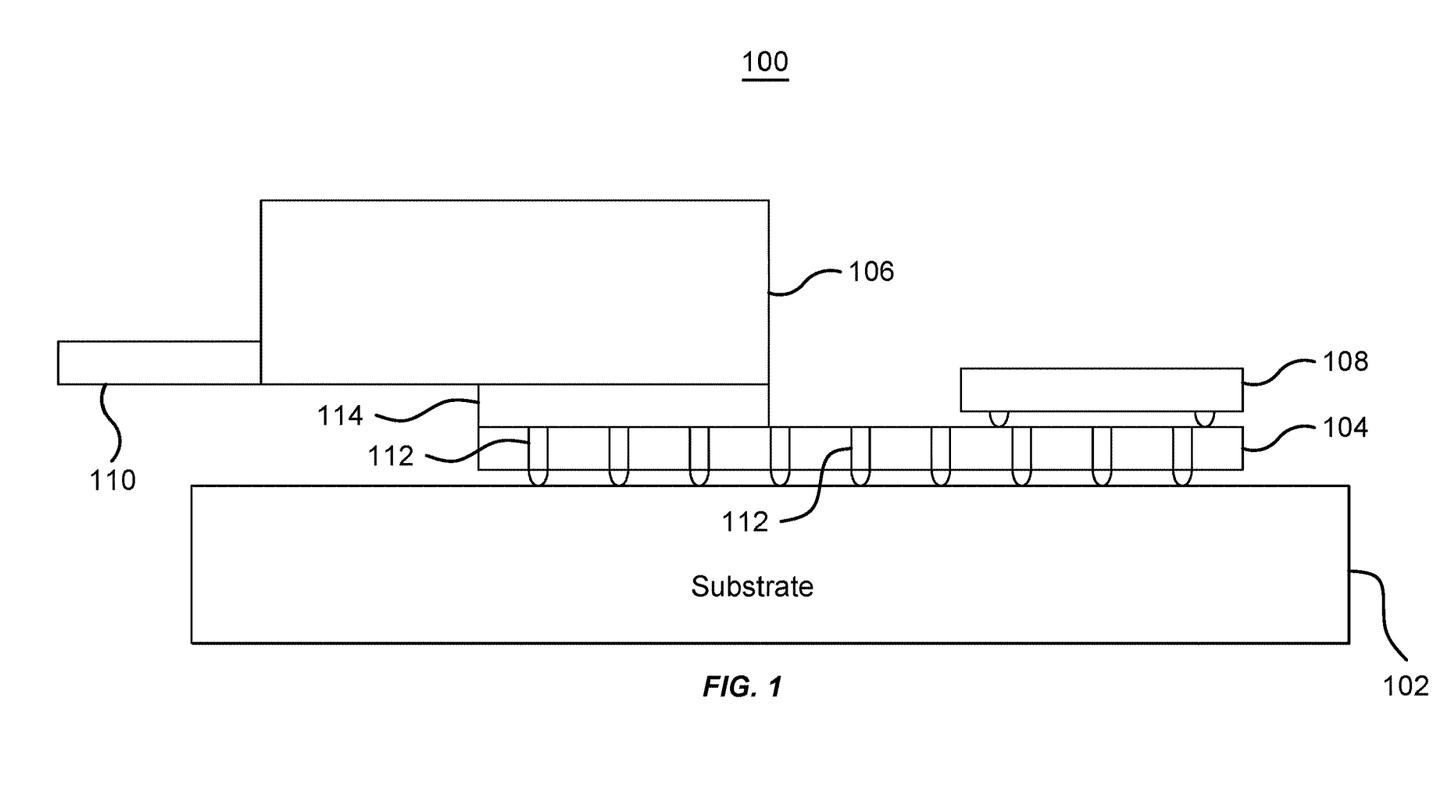
FIG. 1 illustrates an example optical system.

FIG. 1 illustrates an example optical system 100. As seen in FIG. 1, the system 100 includes a substrate 102, a photonic integrated circuit 104, a photonic integrated circuit 106, and an electronic integrated circuit 108. Generally, the photonic integrated circuit 106 may be surface-coupled with the photonic integrated circuit 104, and some of the optical functions of the photonic integrated circuit 104 may be offloaded to the photonic integrated circuit 106. As a result, the size and/or thickness of the photonic integrated circuit 104 may be reduced in certain embodiments.

The substrate 102 provides a structural foundation for the other components of the system 100. The substrate 102 may be formed using any suitable material. In some embodiments, the substrate 102 may be a printed circuit board or a semiconductor material. Some of the components of the system 100 may be physically or electrically coupled to the substrate 102. For example, the photonic integrated circuit 104 may be physically and electrically coupled to the substrate 102. The substrate 102 may form electrical connections between the photonic integrated circuit 104 and another component electrically coupled to the substrate 102. For example, the substrate 102 may include tracks or wires that electrically couple the photonic integrated circuit 104 to another component that is electrically connected to the substrate 102.

The photonic integrated circuit 104 is attached to the substrate 102. For example, the photonic integrated circuit 104 may be physically mounted on the substrate 102. The photonic integrated circuit 104 may also be electrically coupled to the substrate 102. For example, the photonic integrated circuit 104 may include solder balls that allow the photonic integrated circuit 104 to be soldered to the substrate 102. The soldering may complete electrical connections between the photonic integrated circuit 104 and the substrate 102.

The photonic integrated circuit 104 may convert optical signals into electronic signals, and vice versa. For example, the photonic integrated circuit 104 may receive optical signals from the photonic integrated circuit 106. The photonic integrated circuit 104 may convert these optical signals into electronic signals (e.g., by using a photodiode). The photonic integrated circuit 104 may then communicate the electronic signals to the electronic integrated circuit 108 or to the substrate 102.

As seen in FIG. 1, the photonic integrated circuit 104 may include vias 112 (e.g., through silicon vias) that extend partially or fully through the photonic integrated circuit 104. Some of the vias 112 may electrically couple to the solder balls that attach the photonic integrated circuit 104 to the substrate 102. The vias 112 may carry electronic signals to and from the solder balls. For example, the vias 112 may carry electronic signals from the photonic integrated circuit 104 or the electronic integrated circuit 108 to the solder balls. As another example, the vias 112 may carry electronic signals from the solder balls to the photonic integrated circuit 104 or the electronic integrated circuit 108.

The photonic integrated circuit 106 may be positioned on or mounted on the photonic integrated circuit 104. In some embodiments, the photonic integrated circuit 106 is a fiber array unit. In the example of FIG. 1, a portion of the photonic integrated circuit 106 is mounted or positioned on the photonic integrated circuit 104. Another portion of the photonic integrated circuit 106 extends beyond the boundary of the photonic integrated circuit 104, such that this portion hangs off the photonic integrated circuit 104 and over the substrate 102. The photonic integrated circuit 106 may be physically attached to the photonic integrated circuit 104 in any suitable manner. In the example of FIG. 1, the photonic integrated circuit 106 is physically attached to the photonic integrated circuit 104 using an epoxy or adhesive 114. The epoxy or adhesive 114 may be positioned between the photonic integrated circuit 104 and the photonic integrated circuit 106. The epoxy or adhesive 114 may physically attach or bond the photonic integrated circuit 106 to the photonic integrated circuit 104.

The photonic integrated circuit 106 may include passive optical components that handle or operate on received optical signals. In the example of FIG. 1, an optical fiber 110 may edge couple to the photonic integrated circuit 106. The fiber 110 may carry an optical signal to the photonic integrated circuit 106. In some embodiments, the photonic integrated circuit 106 includes a polarization splitter rotator and optical demultiplexers. The polarization splitter rotator separates the optical signal into optical signals with the same modes. For example, the polarization splitter rotator may separate the optical signal into a transverse electric signal and a transverse magnetic signal. The polarization splitter rotator may then convert the transverse magnetic signal into a transverse electric signal. The optical demultiplexers separate the optical signals from the polarization splitter rotator into optical signals of different wavelengths. The photonic integrated circuit 106 then optically couples these optical signals down into the photonic integrated circuit 104. The photonic integrated circuit 104 may then convert these optical signals into electronic signals for the electronic integrated circuit 108 or the substrate 102. In this manner, the photonic integrated circuit 106 performs some of the optical functions that may otherwise be performed in the photonic integrated circuit 104. By offloading the optical components that would have performed these optical functions to the photonic integrated circuit 106, the size and/or thickness of the photonic integrated circuit 104 may be reduced.

Additionally, because the photonic integrated circuit 106 is positioned or mounted on the photonic integrated circuit 104, there is additional vertical clearance between the photonic integrated circuit 106 and the substrate 102 relative to systems where the fiber 110 is edge coupled to the photonic integrated circuit 104. As a result, there is additional vertical space between the fiber 110 and the substrate 102 when the fiber 110 is edge coupled to the photonic integrated circuit 106. Thus, the thickness of the photonic integrated circuit 104 may be reduced, while still accommodating edge coupling for the fiber 110 without contacting the substrate 102.

The electronic integrated circuit 108 is positioned or mounted on the photonic integrated circuit 104. For example, the electronic integrated circuit 108 may include solder balls that allow the electronic integrated circuit 108 to be soldered onto the photonic integrated circuit 104. The solder balls may carry electronic signals between the photonic integrated circuit 104 and the electronic integrated circuit 108. For example, the photonic integrated circuit 104 may convert an optical signal into an electronic signal and then communicate the electronic signal to the electronic integrated circuit 108 through the solder balls. As another example, the electronic integrated circuit 108 may communicate electronic signals through the solder balls to the photonic integrated circuit 104.

Figure 2:
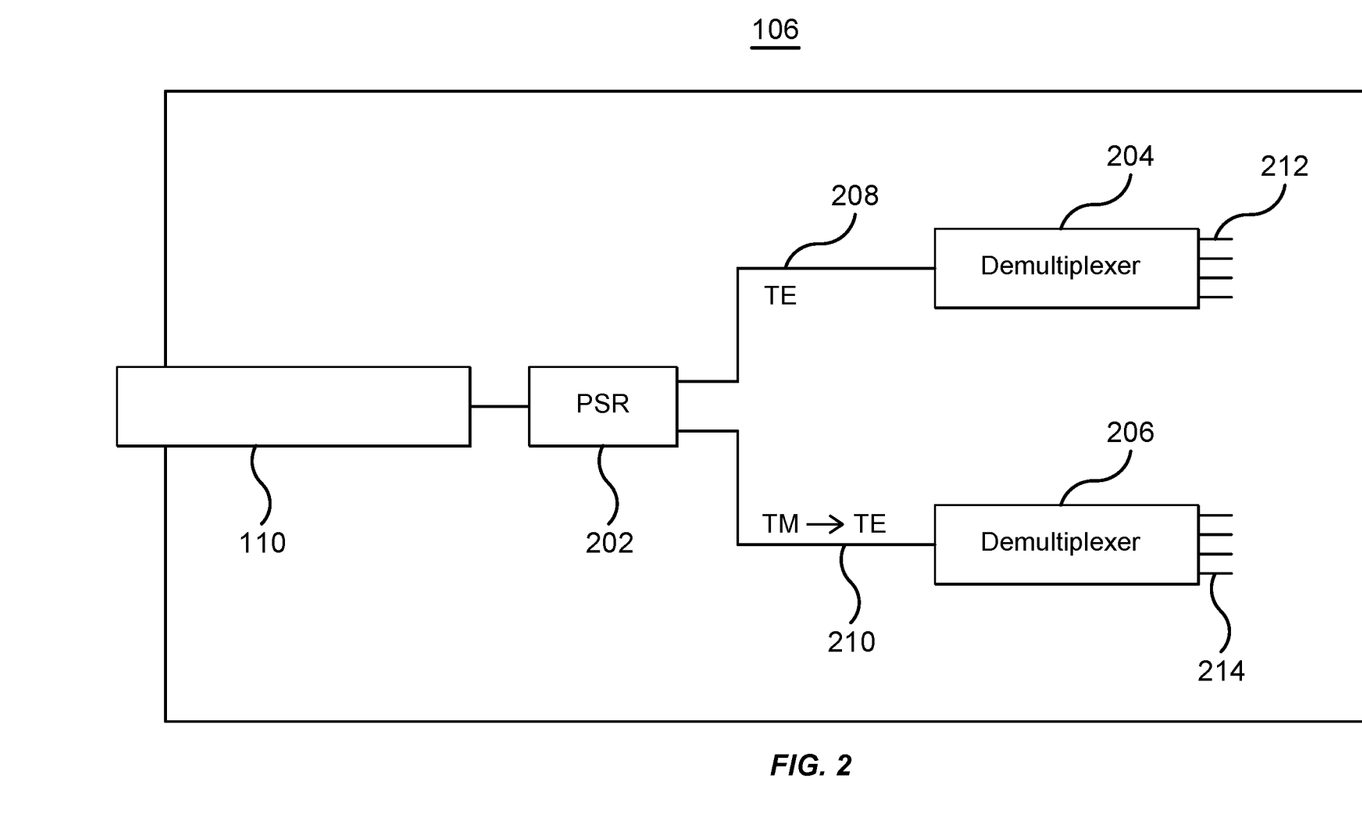
FIG. 2 illustrates an example photonic integrated circuit of the optical system of FIG. 1.

FIG. 2 illustrates an example photonic integrated circuit 106 of the optical system 100 of FIG. 1. As seen in FIG. 2, the photonic integrated circuit 106 includes a polarization splitter rotator 202, a demultiplexer 204, and a demultiplexer 206. Generally, the photonic integrated circuit 106 handles or prepares a received optical signal for the photonic integrated circuit 104.

The optical fiber 110 may carry an optical signal to the photonic integrated circuit 106. In some embodiments, the optical fiber 110 may be edge coupled to the photonic integrated circuit 106. The optical signal may include different modes. The polarization splitter rotator 202 may receive the optical signal from the optical fiber 110. The polarization splitter rotator 202 may separate the received optical signal into optical signals with the same mode. In the example of FIG. 2, the polarization splitter rotator 202 separates the received optical signal into transverse electric and transverse magnetic components or signals. The polarization splitter rotator 202 may output the first transverse electric signal onto an arm 208. The polarization splitter rotator 202 may produce a second transverse electric signal using the transverse magnetic signal. For example, the polarization splitter rotator 202 may rotate the transverse magnetic signal to produce the second transverse electric signal. The polarization splitter rotator 202 may output the second transverse electric signal onto an arm 210.

The arm 208 may carry the first transverse electric signal to the demultiplexer 204. The arm 210 may carry the second transverse electric signal to the demultiplexer 206. The arms 208 and 210 may be waveguides or fibers that carry optical signals between the polarization splitter rotator 202 and the demultiplexers 204 and 206.

The demultiplexers 204 and 206 may separate the first and second transverse electric signals into component optical signals with different wavelengths. The demultiplexer 204 may separate the first transverse electric signal on the arm 208 into component optical signals with different wavelengths. The demultiplexer 204 may then output these component optical signals over the outputs 212. The demultiplexer 206 may separate the second transverse electric signal on the arm 210 into component optical signals with different wavelengths. The demultiplexer 206 may then output these optical signals over the outputs 214. In some embodiments, the outputs 212 and 214 may carry the component optical signals to the photonic integrated circuit 104.

Figure 3A:
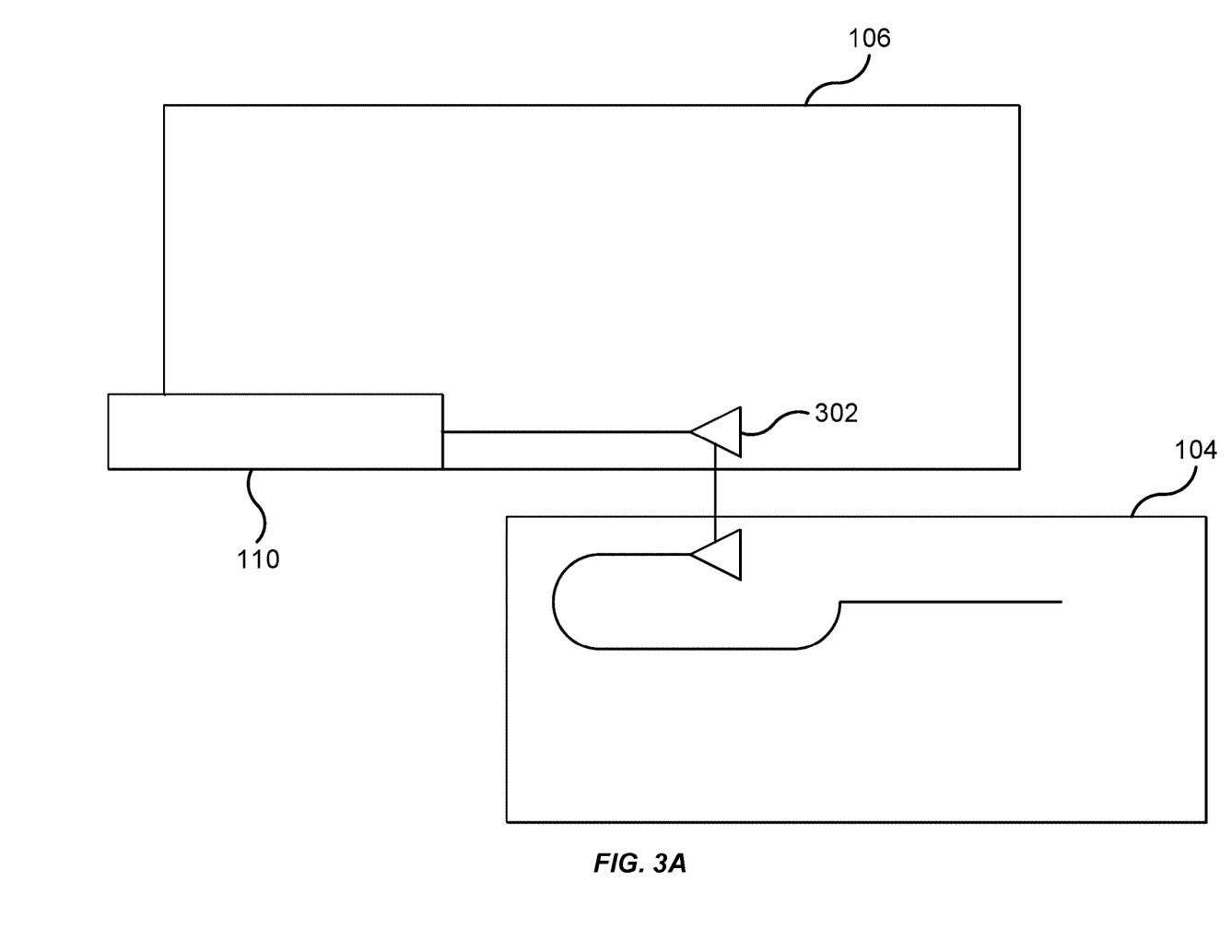
FIGS. 3A through 3C illustrate example portions of the optical system of FIG. 1.
Figure 3B:
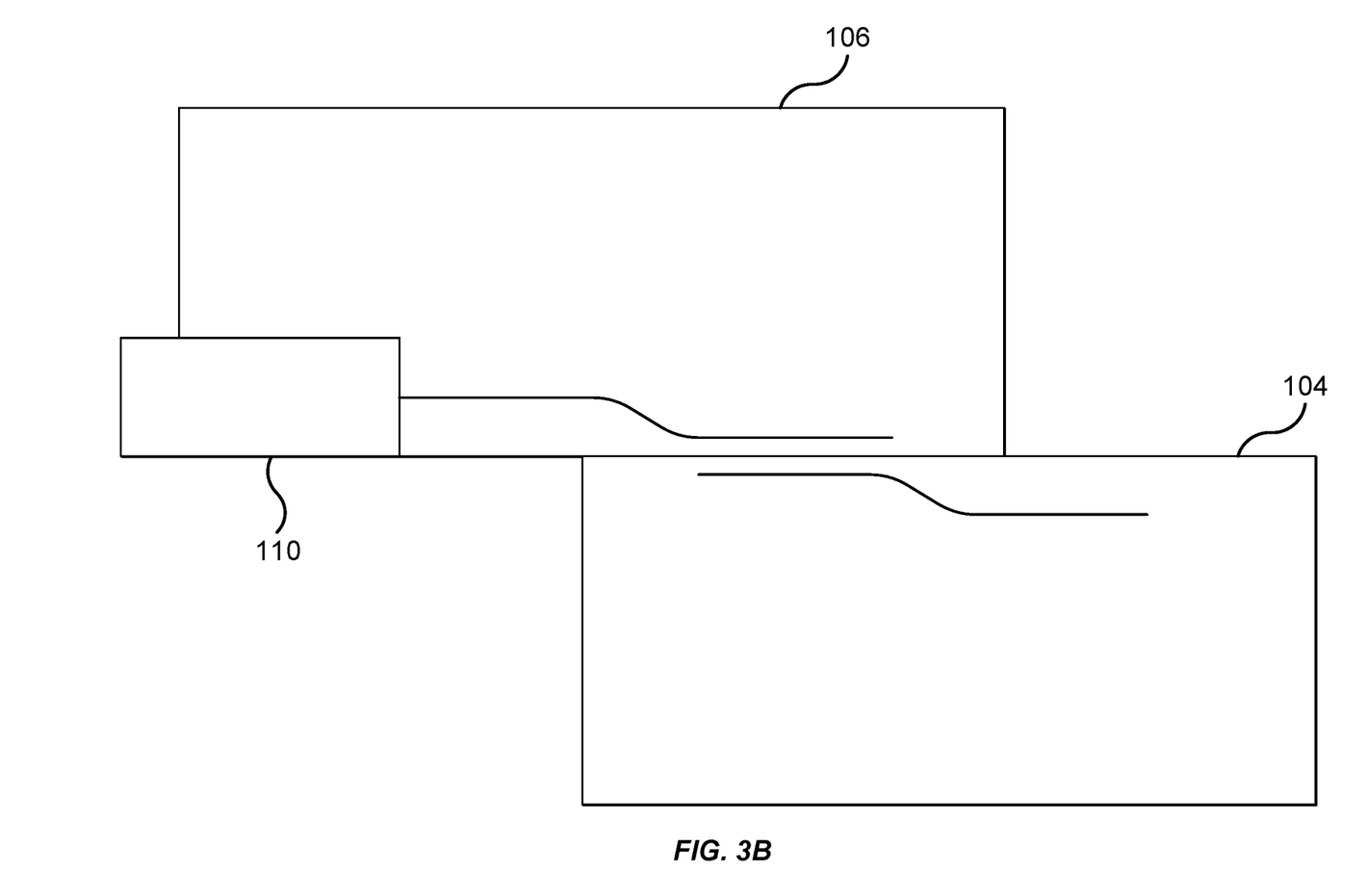
Figure 3C:
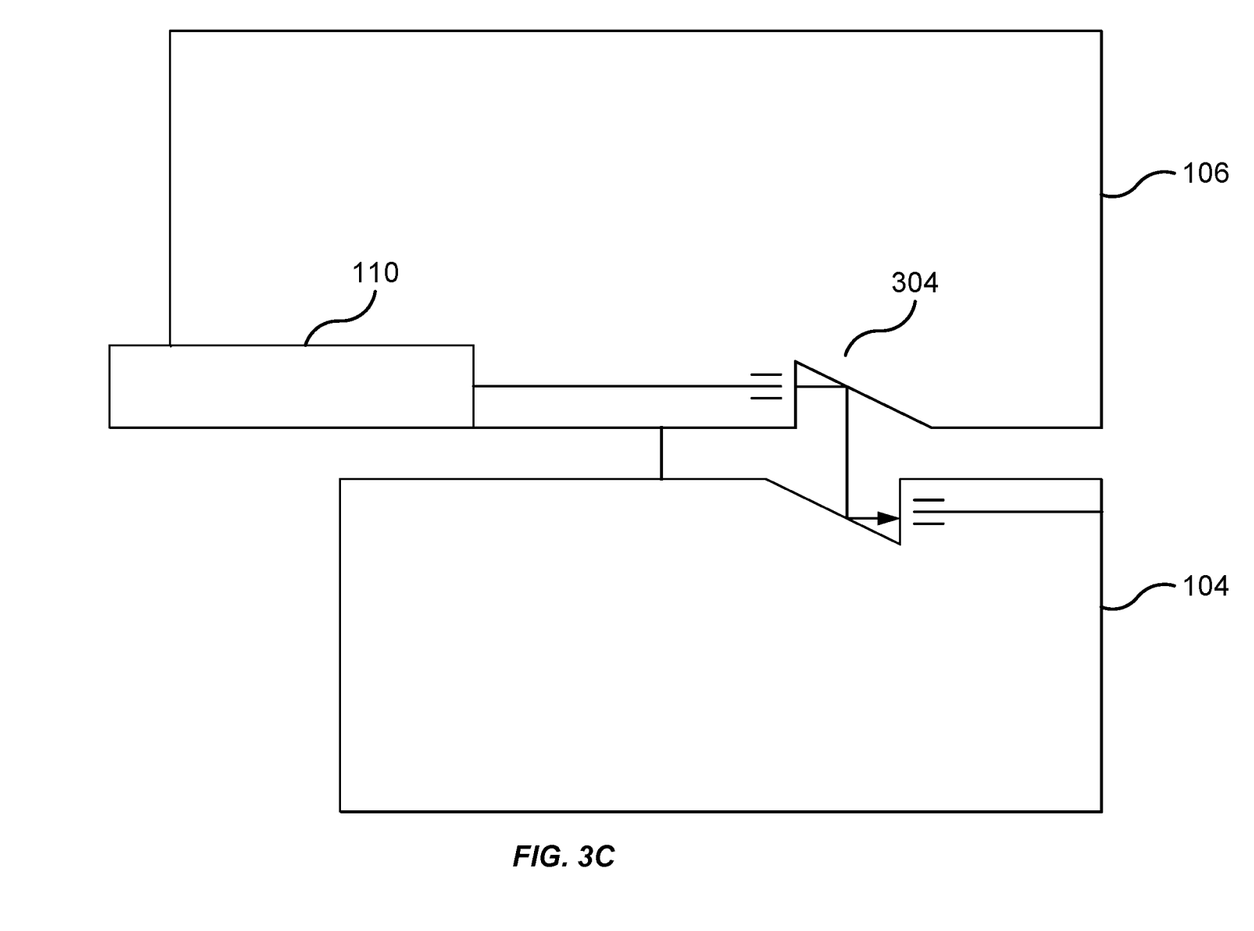

The photonic integrated circuit 106 may optically couple the component optical signals to the photonic integrated circuit 104 in any suitable manner. FIGS. 3A through 3C illustrate different ways to optically couple the component optical signals. In the example of FIG. 3A, the photonic integrated circuit 106 uses a grating coupler 302 to optically couple the component optical signals to the photonic integrated circuit 104. As seen in FIG. 3A, the grating coupler 302 may be positioned in the photonic integrated circuit 106 and the photonic integrated circuit 104. The grating coupler 302 may optically couple component optical signals from the photonic integrated circuit 106 down to the photonic integrated circuit 104.

In the example of FIG. 3B the photonic integrated circuit 106 uses evanescent coupling to optically couple the component optical signals down to the photonic integrated circuit 104. As seen in FIG. 3B, the photonic integrated circuit 106 and the photonic integrated circuit 104 include waveguides or fibers that extend parallel or close to each other, which allows these waveguides or fibers to evanescently couple to each other.

In the example of FIG. 3C, the photonic integrated circuit 106 uses free space coupling to optically couple the component optical signals down to the photonic integrated circuit 104. As seen in FIG. 3C, the photonic integrated circuit 106 and the photonic integrated circuit 104 include free space couplers 304 that optically couple the component optical signals between the photonic integrated circuit 106 and the photonic integrated circuit 104. The free space couplers 304 may resemble triangular cutouts in the photonic integrated circuit 106 and the photonic integrated circuit 104. The triangular cutouts may reflect the component optical signals in the photonic integrated circuit 106 down into the photonic integrated circuit 104.

The photonic integrated circuit 106 may include any suitable optical components that handle or operate on optical signals. As seen in the examples of FIGS. 4A and 4B, the photonic integrated circuit 106 may perform any suitable optical operation on optical signals for the photonic integrated circuit 104.

Figure 4A:
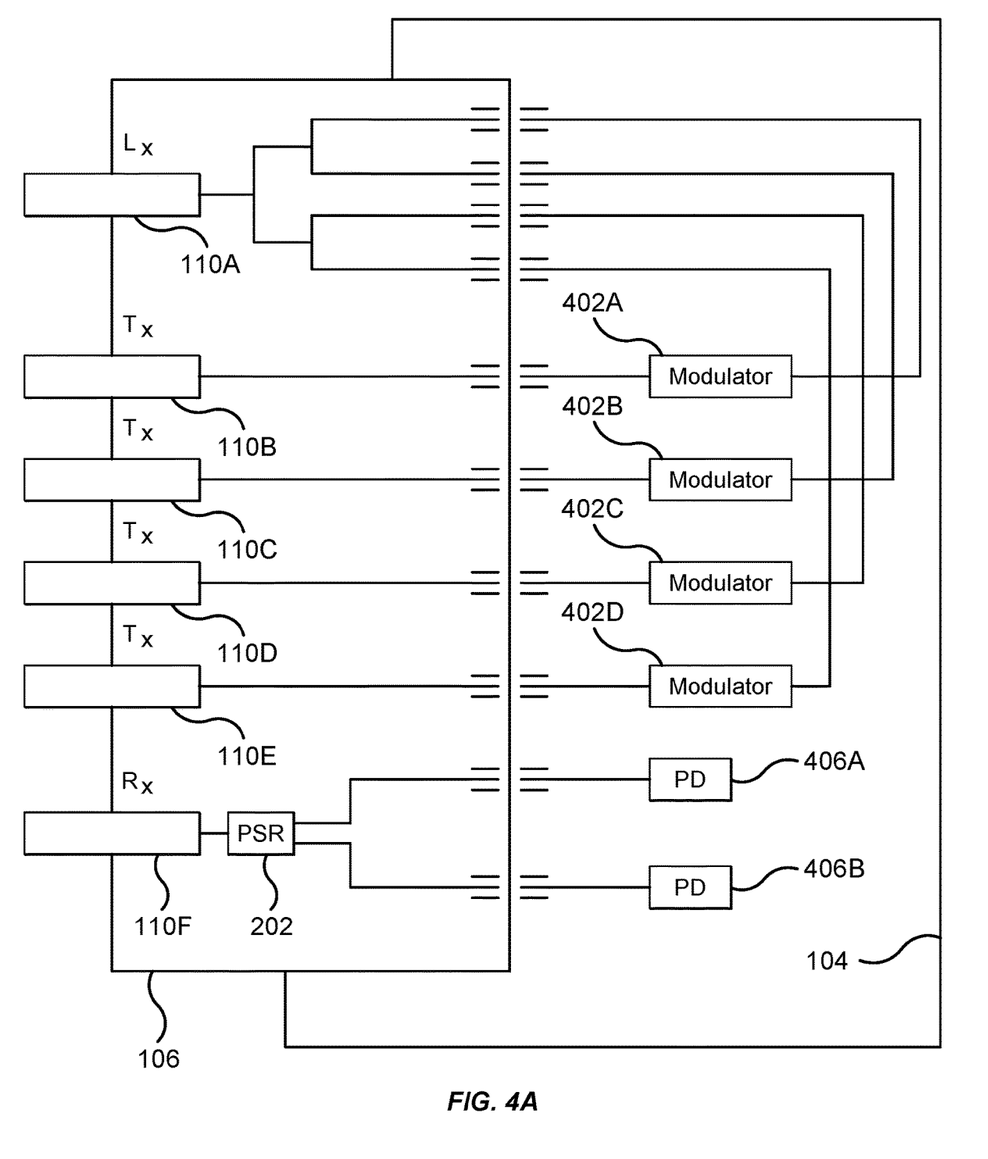
FIGS. 4A and 4B illustrate example portions of the optical system of FIG. 1.

FIG. 4A illustrates an example portion of the optical system 100 of FIG. 1. As seen in FIG. 4A, the photonic integrated circuit 106 is coupled to multiple fibers 110A, 110B, 110C, 110D, 110E, and 110F. The fiber 110A may be a long wavelength fiber that receives long wavelength transmissions (e.g., 270 to 1355 manometer transmissions). The photonic integrated circuit 106 may separate the long wavelength transmission into component optical signals and couple these component optical signals into modulators 402A, 402B, 402C, and 402D in the photonic integrated circuit 104. The modulators 402A, 402B, 402C, and 402D may modulate these component optical signals and communicate the modulated component optical signals back to the photonic integrated circuit 106. The fibers 110B, 110C, 110D, and 110E may transmit the modulated component optical signals out of the photonic integrated circuit 106.

The fiber 110F may carry an optical signal to the photonic integrated circuit 106. The polarization splitter rotator 202 in the photonic integrated circuit 106 may separate the optical signal into optical signals with the same mode (e.g., transverse electric signals). The photonic integrated circuit 106 may then carry the optical signals to photodiodes 406A and 406B in the photonic integrated circuit 104. The photodiodes 406A and 406B may convert the optical signals into electronic signals.

Figure 4B:
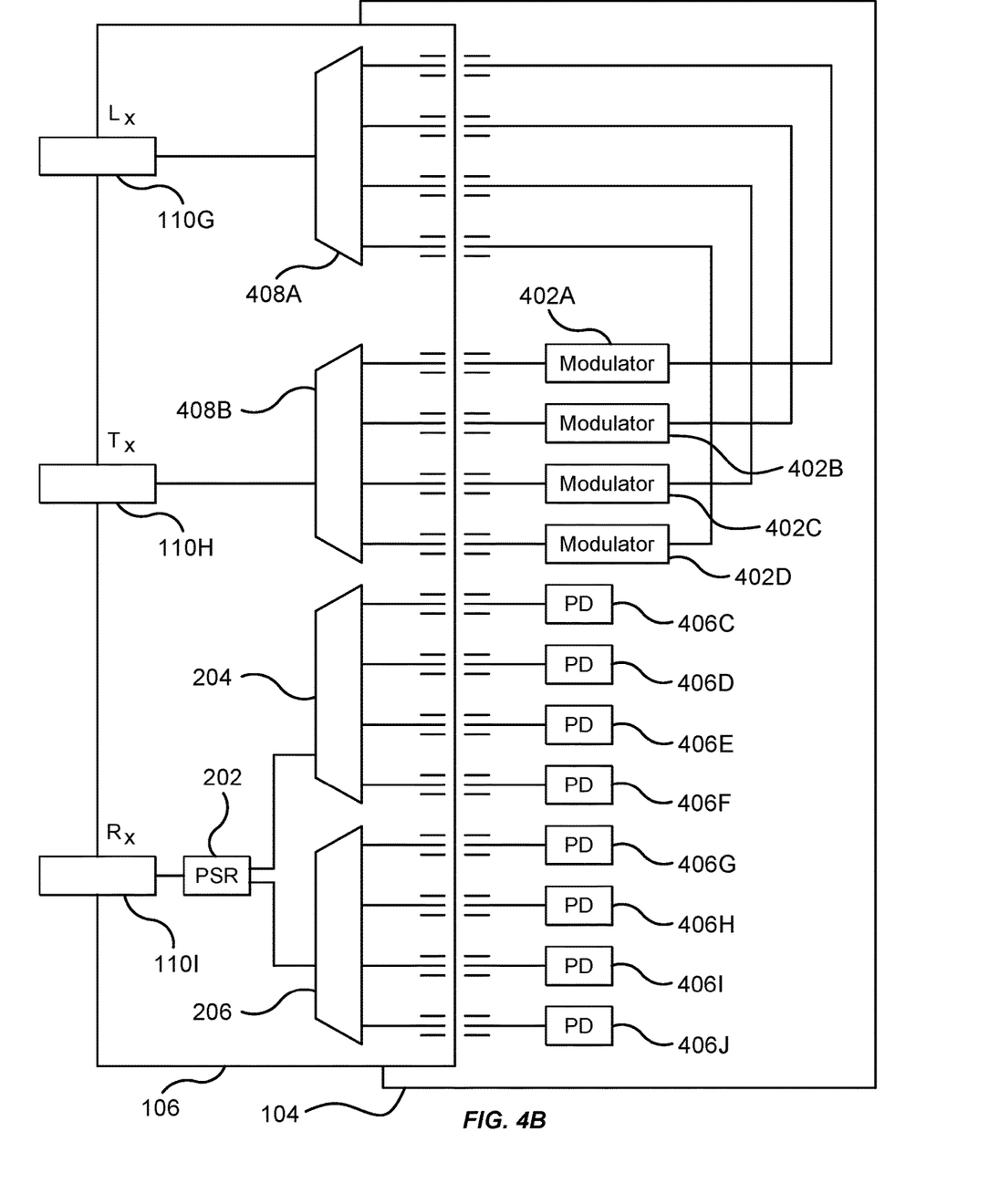

FIG. 4B illustrates example portions of the optical system 100 of FIG. 1. As seen in FIG. 4B, the photonic integrated circuit 106 may be optically coupled to the fibers 110G, 110H, and 110I. The fiber 110G may carry a long wavelength transmission to the photonic integrated circuit 106. The photonic integrated circuit 106 may include a demultiplexer 408A that separates the long wavelength transmission into component optical signals. The photonic integrated circuit 106 may communicate the component optical signals to the modulators 402A, 402B, 402C, and 402D in the photonic integrated circuit 104. The modulators 402A, 402B, 402C, and 402D may modulate the component optical signals and communicate the modulated component optical signals back to the photonic integrated circuit 106. A multiplexer 408B in the photonic integrated circuit 106 may then select and communicate the modulated component optical signals over the fiber 110H and out of the photonic integrated circuit 106.

The photonic integrated circuit 106 may receive an optical signal over the fiber 110I. The polarization splitter rotator 202 may separate the optical signal into optical signals with the same mode (e.g., transverse electric signals). The polarization splitter rotator 202 may communicate the optical signals to the demultiplexers 204 and 206. The demultiplexers 204 and 206 may separate the optical signals into component optical signals with different wavelengths. The demultiplexers 204 and 206 may then communicate these component optical signals to photodiodes 406C, 406D, 406E, 406F, 406G, 406H, 406I, and 406J in the photonic integrated circuit 104. The photodiodes 406C, 406D, 406E, 406F, 406G, 406H, 406I, and 406J may convert these optical signals into electronic signals.

Figure 5A:
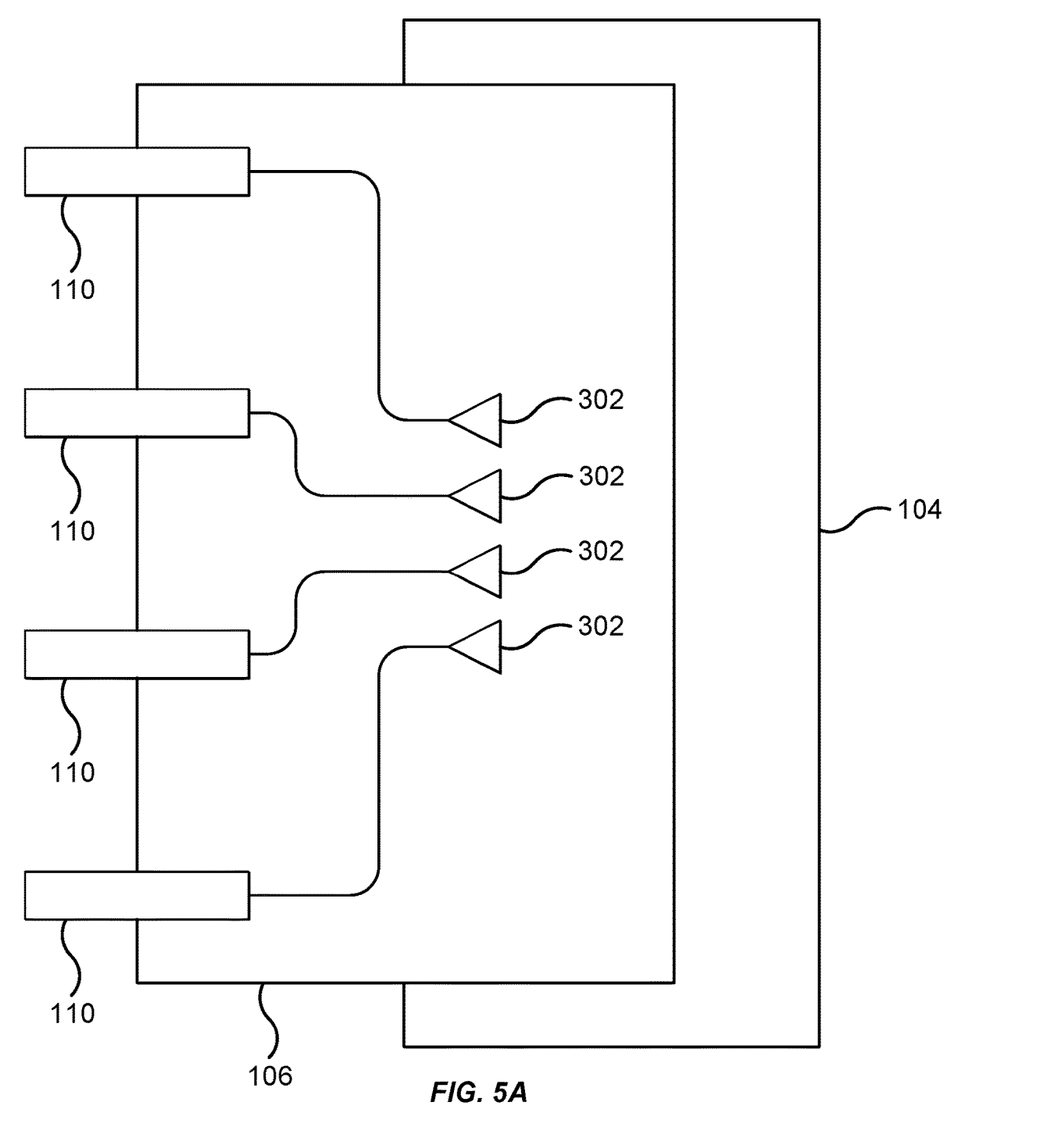
FIGS. 5A through 5C illustrate example portions of the optical system of FIG. 1.
Figure 5B:
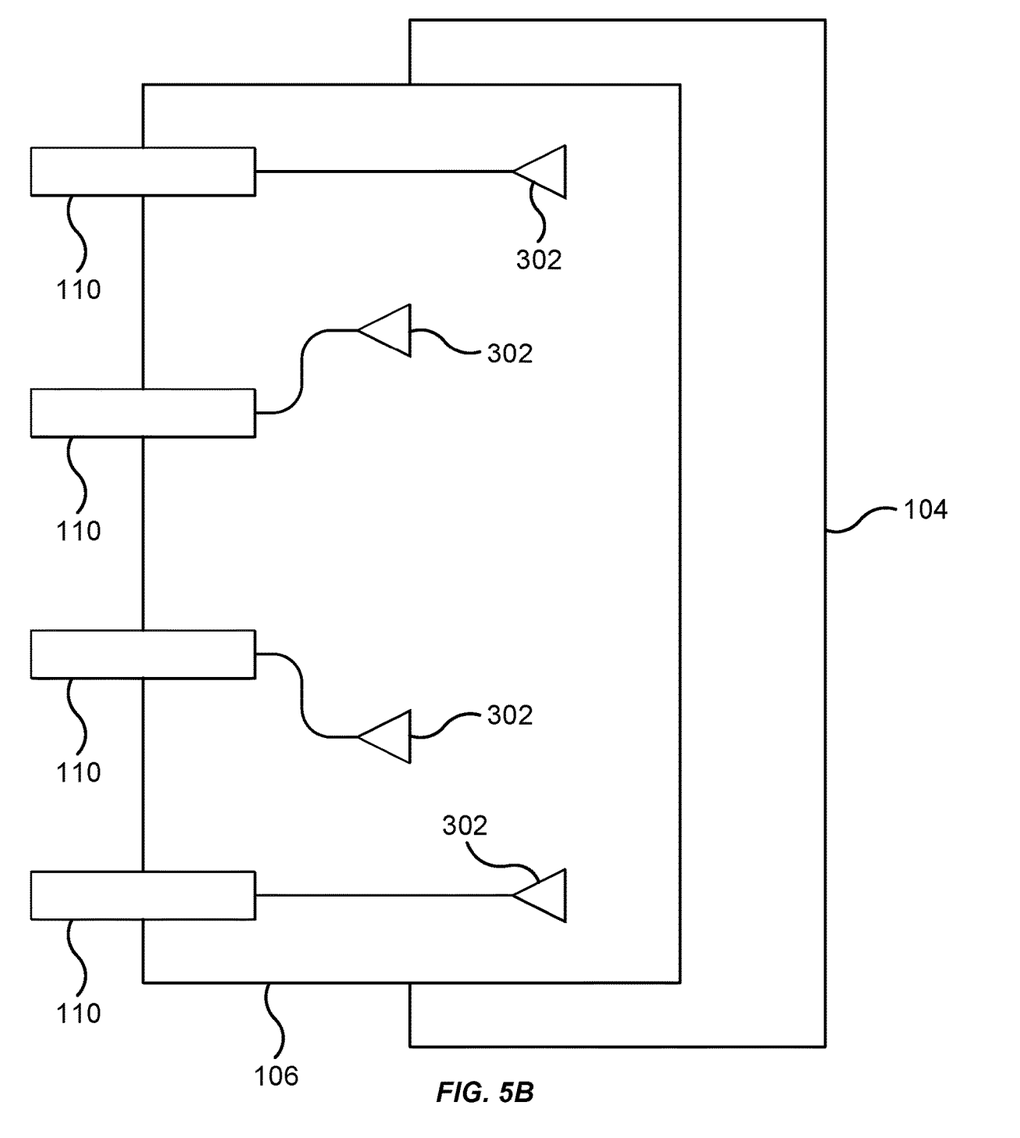
Figure 5C:
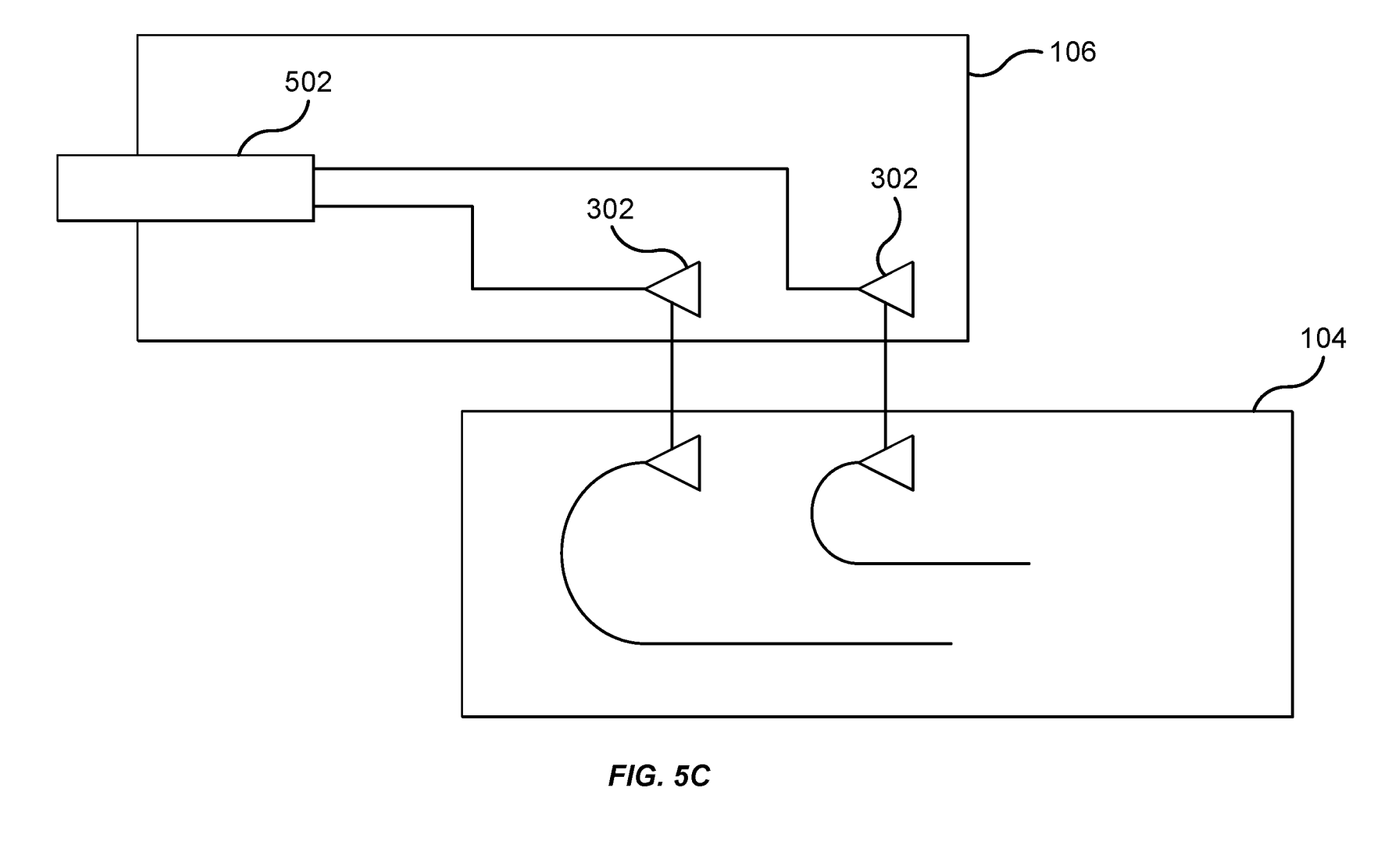

Grating couplers 302 in the photonic integrated circuit 106 may be positioned or arranged in any suitable manner. FIGS. 5A through 5C illustrate example configurations of grating couplers 302 in the photonic integrated circuit 106. As seen in FIG. 5A, the photonic integrated circuit 106 may include multiple grating couplers 302 that are optically coupled to multiple fibers 110. The grating couplers 302 may be aligned in the photonic integrated circuit 106 and may optically couple optical signals down to the photonic integrated circuit 104.

As seen in FIG. 5B, the grating couplers 302 may be offset or misaligned with each other in the photonic integrated circuit 106. As a result, the grating couplers 302 may optically couple optical signals down to offset or misalign the portions of the photonic integrated circuit 104. The offset or misalignment may be different for each grating coupler 302. The grating couplers 302 need not be arranged symmetrically with respect to each other.

In the example of FIG. 5C, the photonic integrated circuit 106 optically couples to a multicore fiber 502. The photonic integrated circuit 106 includes multiple grating couplers 302 that optically couple to different cores of the multicore fiber 502. The grating couplers 302 optically couple optical signals from the different cores down to the photonic integrated circuit 104.

Figure 6:
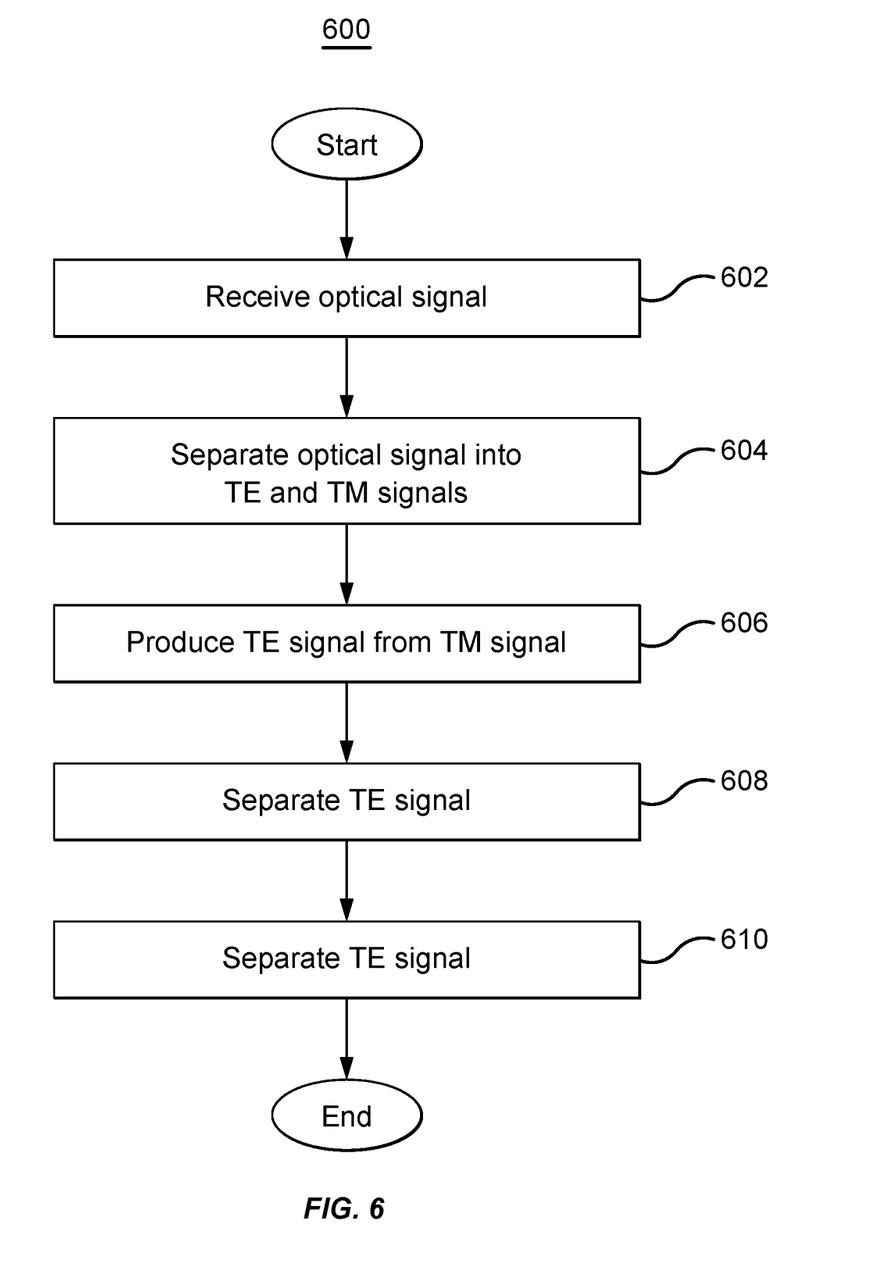
FIG. 6 is a flowchart of an example method performed in the system of FIG. 1.

FIG. 6 is a flowchart of an example method 600 performed in the system 100 of FIG. 1. In particular embodiments, the photonic integrated circuit 106 performs the steps of the method 600. By performing the method 600, the photonic integrated circuit 106 operates on and prepares an optical signal for the photonic integrated circuit 104.

In block 602, the photonic integrated circuit 106 receives an optical signal. For example, the photonic integrated circuit 106 may receive the optical signal from an optical fiber 110. The optical fiber 110 may be edge coupled to the photonic integrated circuit 106. The optical signal may include different modes (e.g., a transverse electric mode and a transverse magnetic mode).

In block 604, the photonic integrated circuit 106 separates the optical signal into optical signals with the same mode. The photonic integrated circuit 106 may include a polarization splitter rotator 202 that receives the optical signal and separates the optical signal into a first transverse electric signal and a transverse magnetic signal. The polarization splitter rotator 202 may rotate the transverse magnetic signal to produce a second transverse electric signal in block 606. In this manner, the polarization splitter rotator 202 produces optical signals with the same mode.

In block 608 and 610, the photonic integrated circuit 106 separates the optical signals from the polarization splitter rotator 202 into component optical signals with different wavelengths. Specifically, the demultiplexers 204 and 206 in the photonic integrated circuit 106 may separate the optical signals into component optical signals with different wavelengths. The photonic integrated circuit 106 may then optically couple these component optical signals into the photonic integrated circuit 104. For example, the photonic integrated circuit 106 may use grating couplers 302 to optically couple these component optical signals down to the photonic integrated circuit 104.

In summary, the optical system 100 may offload some of the passive optical components from the photonic integrated circuit 104. Generally, the optical system 100 includes a second photonic integrated circuit 106 that includes some of the passive optical components (e.g., polarization splitter rotator 202, demultiplexers 204 and 206, etc.) that would otherwise be included in the photonic integrated circuit 104. The second photonic integrated circuit 106 may also optically couple to the photonic integrated circuit 104 through a top surface of the photonic integrated circuit 104. As a result, the second photonic integrated circuit 106 provides additional vertical clearance for an optical fiber 110 to edge couple to the second photonic integrated circuit 106.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

In view of the foregoing, the scope of the present disclosure is determined by the claims that follow.

We claim:

1. An optical system comprising:
    a substrate;
    a first photonic integrated circuit positioned on the substrate;
    a second photonic integrated circuit positioned on the first photonic integrated circuit, wherein the second photonic integrated circuit is arranged to receive a first optical signal comprising a first mode and a second mode different from the first mode, and wherein the second photonic integrated circuit comprises:
        a polarization splitter rotator arranged to separate the first optical signal into a second optical signal with the first mode and a third optical signal with the first mode;
        a first demultiplexer arranged to separate the second optical signal into a first plurality of optical signals; and
        a second demultiplexer arranged to separate the third optical signal into a second plurality of optical signals, wherein the first plurality of optical signals and the second plurality of optical signals couple into the first photonic integrated circuit; and an electronic integrated circuit positioned on the first photonic integrated circuit wherein the first photonic integrated circuit is arranged to produce, based on the first plurality of optical signals or the second plurality of optical signals, electronic signals for the electronic integrated circuit.

2. The optical system of claim 1, wherein the first photonic integrated circuit comprises a through silicon via.

3. The optical system of claim 1, wherein the first plurality of optical signals and the second plurality of optical signals couple into the first photonic integrated circuit using a grating coupler positioned in the first photonic integrated circuit or the second photonic integrated circuit.

4. The optical system of claim 1, wherein the first plurality of optical signals and the second plurality of optical signals evanescently couple to the first photonic integrated circuit.

5. The optical system of claim 1, wherein the first plurality of optical signals and the second plurality of optical signals couple into the first photonic integrated circuit using a free space coupler positioned in the first photonic integrated circuit or the second photonic integrated circuit.

6. The optical system of claim 1, wherein the second photonic integrated circuit is arranged to edge couple with an optical fiber that carries the first optical signal to the second photonic integrated circuit.

7. The optical system of claim 1, wherein the second photonic integrated circuit is coupled to the first photonic integrated circuit by an epoxy.

8. The optical system of claim 1, wherein a portion of the second photonic integrated circuit extends beyond a boundary of the first photonic integrated circuit.

9. A method comprising:
receiving, at a first photonic integrated circuit, a first optical signal comprising a first mode and a second mode different from the first mode, and wherein the first photonic integrated circuit comprises a polarization splitter rotator, a first demultiplexer, and a second demultiplexer;
separating, by the polarization splitter rotator, the first optical signal into a second optical signal with the first mode and a third optical signal with the first mode;
separating, by the first demultiplexer, the second optical signal into a first plurality of optical signals;
separating, by the second demultiplexer, the third optical signal into a second plurality of optical signals;
coupling the first plurality of optical signals and the second plurality of optical signals couple into a second photonic integrated circuit, wherein the first photonic integrated circuit is positioned on the second photonic integrated circuit; and
producing, by the second photonic integrated circuit and based on the first plurality of optical signals or the second plurality of optical signals, electronic signals for an electronic integrated circuit positioned on the second photonic integrated circuit.

10. The method of claim 9, wherein the second photonic integrated circuit comprises a through silicon via.

11. The method of claim 9, wherein the first plurality of optical signals and the second plurality of optical signals couple into the second photonic integrated circuit using a grating coupler positioned in the first photonic integrated circuit or the second photonic integrated circuit.

12. The method of claim 9, wherein the first plurality of optical signals and the second plurality of optical signals evanescently couple to the first photonic integrated circuit.

13. The method of claim 9, wherein the first plurality of optical signals and the second plurality of optical signals couple into the first photonic integrated circuit using a free space coupler positioned in the first photonic integrated circuit or the second photonic integrated circuit.

14. The method of claim 9, wherein the second photonic integrated circuit is arranged to edge couple with an optical fiber that carries the first optical signal to the second photonic integrated circuit.

15. The method of claim 9, wherein the second photonic integrated circuit is coupled to the first photonic integrated circuit by an epoxy.

16. An optical circuit comprising:
a first photonic integrated circuit comprising:
a polarization splitter rotator arranged to separate a first optical signal into a second optical signal with a first mode and a third optical signal with the first mode, wherein the first optical signal comprises the first mode and a second mode different from the first mode;
a plurality of demultiplexers arranged to separate the second optical signal into a first plurality of optical signals and the third optical signal into a second plurality of optical signals;
a second photonic integrated circuit arranged to produce one or more electronic signals based on the first plurality of optical signals and the second plurality of optical signals from the first photonic integrated circuit, wherein the first photonic integrated circuit is positioned on the second photonic integrated circuit; and
an electronic integrated circuit positioned on the second photonic integrated circuit, wherein the electronic integrated circuit is arranged to receive the one or more electronic signals from the photonic integrated circuit.

* * * * *